(No Model.)
F. F. FIELD.
FAUCET.
No. 602,598. Patented Apr. 19, 1898.
Fig. 1.
Fig. 2.
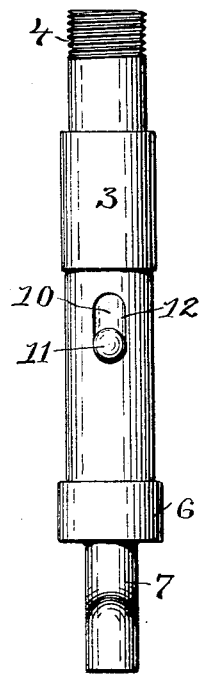
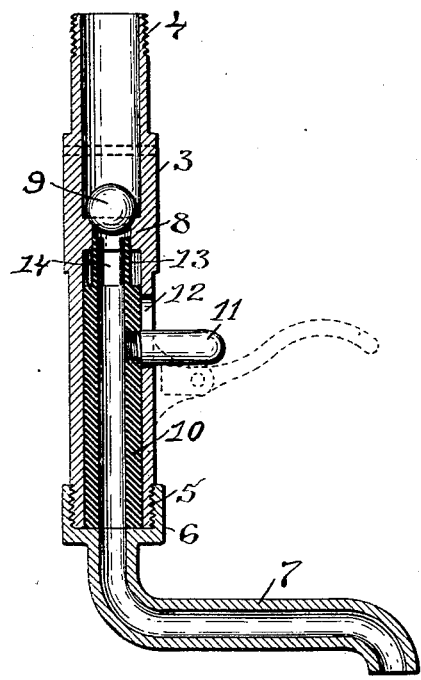
WITNESSES:
M. F. Bligh.
Chas. H. Luther Jr.
INVENTOR:
Frederick F. Field,
by Joseph A. Miller & Co.,
Attys.

UNITED STATES PATENT OFFICE.

FREDERICK F. FIELD, OF PROVIDENCE, RHODE ISLAND.

FAUCET.

SPECIFICATION forming part of Letters Patent No. 602,598, dated April 19, 1898.

Application filed March 29, 1897. Serial No. 629,735. (No model.)

*To all whom it may concern:*

Be it known that I, FREDERICK F. FIELD, of Providence, in the county of Providence and State of Rhode Island, have invented a new and useful Improvement in Faucets; and I hereby declare that the following is a full, clear, and exact description of the same, reference being had to the accompanying drawings, forming part of this specification.

The invention has reference to an improvement in a faucet or valve for controlling the flow of liquid; and it consists in the peculiar and novel construction, as will be more fully set forth hereinafter.

Figure 1 is a front view of my improved faucet. Fig. 2 is a vertical sectional view of the same, showing the valve and operating devices.

In the drawings, 3 indicates a pipe provided at its upper end with a screw-thread 4, by which it may be connected with a tank or a water-supply conduit; 5, a screw-thread at the lower end for connecting the pipe with the socket 6 of the outlet-pipe 7. The pipe 3 has the contracted portion 8, the upper part of which forms the seat for the ball-valve 9. The tube 10 fits into the lower part of the pipe 3 with an easy sliding fit. The tube 10 is provided with the pin 11, which extends through the slot 12 in the pipe 3. The upper end of the tube 10 has the tubular projection 13, which fits the hole in the contracted portion 8 with a sliding fit.

In the normal condition the parts are in the relative positions indicated in Fig. 2. The ball 9 closes the outlet of the water or other fluid, the tube 10 rests on the socket 6, and the projecting tubular portion 13 is a little below the ball 9. When now the tube 10 is raised by the pin 11, or by means of a lever, as indicated in broken lines in Fig. 2, the contracted portion 13 raises the ball 9 off from the valve-seat, and as this part 13 is provided with one or more slots 14 the liquid released by the raising of the ball enters the tube 10 through the slot or slots 14 and passes down through the tube into and through the outlet-pipe 7 as long as the tube 10 is held in the raised position. As soon as the tube 3 is released the ball 9 closes the outlet and the tube 10 descends until it rests in the socket 6.

The device is simple and cheap in construction. It may be placed at any desired point into and form part of the conduits of a water or other fluid system. It is self-closing and readily opened.

Having thus described my invention, I claim as new and desire to secure by Letters Patent—

In a faucet, the combination with the pipe 3 screw-threaded at the opposite ends, the contracted portion 8 forming a seat for the ball-valve, the slot 12 in said pipe, the curved outlet-pipe 7, the socket 6 on the pipe 7 whereby it is rigidly secured to the pipe 3 and forms a stop for the tube 10, of the tube 10, the slotted extension 13 of the tube, and the pin 11 whereby the tube 10 is supported in the socket and when raised lifts the ball-valve off from its seat and permits the fluid to pass through the slots and the tube to the outlet-pipe to be discharged, as described.

In witness whereof I have hereunto set my hand.

FREDERICK F. FIELD.

Witnesses:
JOSEPH A. MILLER, Jr.,
M. F. BLIGH.